United States Patent [19]
Resconi et al.

[11] Patent Number: 5,910,464
[45] Date of Patent: Jun. 8, 1999

[54] CATALYSTS FOR THE POLYMERIZATION OF OLEFINS

[75] Inventors: Luigi Resconi, Ferrara; Maurizio Galimberti, Milan; Fabrizio Piemontesi, Borgosesia; Floriano Guglielmi, Ferrara; Enrico Albizzati, Arona, all of Italy

[73] Assignee: Montell Technology Company bv, Hoofddorp, Netherlands

[21] Appl. No.: 09/003,928

[22] Filed: Jan. 7, 1998

Related U.S. Application Data

[63] Continuation of application No. 08/819,105, Mar. 17, 1997, abandoned, which is a continuation of application No. 08/589,058, Jan. 19, 1996, abandoned, which is a continuation of application No. 08/468,769, Jun. 6, 1995, abandoned, which is a continuation of application No. 08/140,579, Oct. 21, 1993, abandoned, which is a continuation-in-part of application No. 08/079,133, Jun. 18, 1993, abandoned.

[30] Foreign Application Priority Data

| Jun. 18, 1992 | [IT] | Italy | MI921497 U |
| Jun. 18, 1992 | [IT] | Italy | MI941498 U |
| Sep. 24, 1992 | [IT] | Italy | MI922179 U |

[51] Int. Cl.$^6$ ................... C08F 4/64; C08F 4/42
[52] U.S. Cl. .............. 502/111; 502/111; 502/152; 502/155; 526/127; 526/160; 526/943
[58] Field of Search .................. 502/111, 117, 502/152, 155

[56] References Cited

U.S. PATENT DOCUMENTS

| 5,006,500 | 4/1991 | Chang | 502/107 |
| 5,086,025 | 2/1992 | Chang | 502/117 |
| 5,087,788 | 2/1992 | Wu | 585/512 |
| 5,296,565 | 3/1994 | Ueda et al. | 526/114 |

FOREIGN PATENT DOCUMENTS

| 0 308 177 A1 | 3/1989 | European Pat. Off. |
| 0 324 856 A1 | 7/1989 | European Pat. Off. |
| 0 328 348 A2 | 8/1989 | European Pat. Off. |
| 0 381 184 A2 | 1/1990 | European Pat. Off. |
| 0 363 029 A2 | 4/1990 | European Pat. Off. |
| 0 384 171 A1 | 9/1990 | European Pat. Off. |
| 0 520 816 A3 | 12/1992 | European Pat. Off. |
| WO 89/02448 | 3/1989 | WIPO |

OTHER PUBLICATIONS

Wolczanski, et al., *Organometallics*, vol. 1, pp. 793–799 (1982).
Hsieh and Randall, *Macromolecules*, vol. 15, pp. 353–360 (1982).
Jutzi, P., Dickbreder R., Chem. Ber., vol. 119, pp. 1750–1754 (1986).
F.R.W.P. Wild, M. Wasiucionek, G. Huttner and H.H. Brintzinger, *J. Organomet. Chem* vol. 288, p.63 (1985).
Ewen J., *J. Am. Chem. Soc.*, vol. 109, p. 6544, and supplementary material (1987).
*Organometallics*, vol. 9, p. 3098 (1990).
W.A. Hermann et al., *Agnew. Chem. Int. Ed. Engl.* vol. 28, p. 1511 (1989).

*Primary Examiner*—David W. Wu
*Attorney, Agent, or Firm*—Bryan Cave LLP

[57] ABSTRACT

A catalyst for the polymerization of olefins comprises the product obtained by contacting:

(A) a titanium, zirconium or hafnium mono- or bis-cyclopentadienyl compound, this latter optionally containing a bridging group which links the two cyclopentadienyl compounds;

(B) an alkyl aluminium wherein at least one alkyl is different from a straight alkyl; and (C) water.

The molar ratio aluminium/water is higher than 1:1 and lower than 100:1.

10 Claims, No Drawings

CATALYSTS FOR THE POLYMERIZATION OF OLEFINS

This application is a continuation of application Ser. No. 08/819,105 filed Mar. 17, 1997 which in turn, is a continuation of application Ser. No. 08/589,058 filed Jan. 19, 1996, now abandoned, which in turn is a continuation of application Ser. No.08/468,769 filed Jun. 6, 1995, now abandoned, which in turn is a continuation of application Ser. No. 08/140,579 filed Oct. 21, 1993, now abandoned, which in turn is a continuation-in-part of application Ser. No. 08/079,133 filed Jun. 18, 1993, now abandoned.

The present invention relates to catalysts for the polymerization of olefins obtained from cyclopentadienyl compounds, organometallic aluminium compounds and water.

Homogeneous catalytic systems for the polymerization of olefins, prepared by contacting a metallocene, an aluminium alkyl and water are known.

Published International patent application WO 89/02448, for instance, describes a method for preparing a metallocene-aluminoxane catalyst in situ during the polymerization. On a metallocene-aluminium alkyl catalyst, the monomer to be polymerized containing 100–10,000 ppm of water is fed. The molar ratio alkyl aluminium-water varies from about 1:1 to about 2:1.

U.S. Pat. No. 5,086,025 describes a process for preparing a metallocene-aluminoxane catalyst supported on silica. Water impregnated silica is added to an aluminium trialkyl solution and, thereafter, the metallocene is added. By contacting reagents in a different order, undoubtedly inferior results are obtained. The contact is carried out with a molar ratio between the trialkyl aluminium and water comprised between about 10:1 and 1:1 and, preferably, between about 5:1 and 1:1. Useable metallocenes are all the cyclopentadienyl derivatives of transition metals. Those preferred are zirconocenes and titanocenese among which substituted or unsubstituted cyclopentadienyl derivatives and compounds having two unsubstituted cyclopentadienes linked with a bridging group are exemplified. Preferred aluminium trialkyls are trimethyl aluminium and triethyl aluminium. Yields in polyolefins are extremely low.

Alkyl aluminium compounds with alkyl groups having three or more carbon atoms have rarely been used in this kind of catalyst systems.

U.S. Pat. No. 5,006,500 describes a catalyst for the polymerization of α-olefins comprising the reaction product of:
(a) silica gel having a content of adsorbed water equal to 6–20% by weight,
(b) a mixture of trimethyl aluminium (TMA) and triisobutyl aluminium (TIBA) in molar ratio comprised between 2:1 and 1000:1, and
(c) a metallocene of a metal belonging to group IV and/or VB.

In example 4 (comparison example) ethylene is polymerized in the presence of a catalyst comprising di-(n-butylcyclopentadienyl) zirconium dichloride, TIBA and silica gel containing 12.8% of water. The molar ratio TIBA/water is 0.86:1. The quantity of polyethylene obtained is about 20 times lower than the quantity obtained in example 1 wherein a mixture TMA/TIBA is used.

In European Patent application 384,171, catalysts suitable for the polymerization of olefins are described, which comprise the reaction product between:
(a) a metallocene compound having the formula:

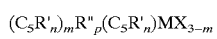

wherein $(C_5R'_n)$ is a cyclopentadienyl group, substituted or not, and where two or four R' substituents of a same cyclopentadienyl group can form one or two ring having 4 to 6 carbon atoms; R" is a divalent radical bridging the two cyclopentadienyl groups; X can be, for instance an halogen atom; M is a transition metal in valence state of 3 or 4 selected from Ti, Zr and Hf; p is 0 or 1; m is 0, 1 or 2; when m=0, p is=0 and when p=0 at least one radical R' is different from hydrogen; n=4 when p=1 and n=5 when p=0; and (b) an alumoxane compound of formula:

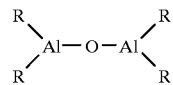

wherein the substituents R are alkyl, alkenyl or alkylaryl radicals having 2 to 20 carbon atoms.

The alumoxane compounds (b) are prepared by reaction of the corresponding aluminium trialkyl with water vapor in 2:1 molar ratio.

In European patent application 381,184, catalysts suitable for the polymerization of ethylene and α-olefins and mixtures thereof are described, which comprise the reaction product between:
(a) a zirconocenic compound of the formula:

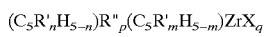

wherein $(C_5R'_nH_{5-n})$ and $(C_5R'_mH_{5-m})$ are cyclopentadienyl groups, substituted or not, and where two or four R' substituents of a same cyclopentadienyl group can form one or two ring having 4 to 6 carbon atoms; R" is a divalent radical bridging the two cyclopentadienyl groups; X can be, for instance an halogen atom; q is 1 if Zr is trivalent and is 2 if Zr is tetravalent; p is 0 or 1; and (b) a trialkyl-aluminium compound or an alkyl-aluminum monohydride.

Particularly suitable catalysts are obtained from compounds wherein groups $(C_5R'_nH_{5-n})$ and $(C_5R'_mH_{5-m})$ are pentamethyl-cyclopentadienyl or indenyl groups.

It has now been found that zirconocenes according to the above mentioned European patent application No. 381,184 in the presence of aluminium trialkyls or aluminium alkyl-hydrides do not give catalysts which are active in the polymerization of olefins.

However, it has unexpectedly been found that zirconocenes of the above type and other cyclopentadienyl compounds give catalysts endowed with very high activity in the polymerization of olefins in the presence of aluminium-alkyl compounds having non-straight alkyl groups and of water.

The catalysts of the present invention comprise the product obtained by contacting the following components:
(A) a cyclopentadienyl compound of the general formula (I):

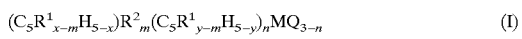

wherein M is a metal selected from the group consisting of Ti, Zr and Hf; $C_5R^1_{x-m}H_{5-x}$ and $C_5R^1_{y-m}H_{5-y}$ are equally or differently substituted cyclopentadienyl rings; the substituents $R^1$, same or different from each other, are alkyl, alkenyl, aryl, alkylaryl or arylalkyl radicals containing from 1 to 20 carbon atoms, which may also contain Si or Ge atoms, or groups $Si(CH_3)_3$, or two or four substituents $R^1$ of the same cyclopentadienyl group can form one or two rings having from 4 to 6 carbon atoms; $R^2$ is a bridging group which links the two cyclopentadienyl rings and is selected among $CR^3{}_2$, $C_2R^3{}_4$, $SiR^3{}_2$, $Si_2R^3{}_4$, $GeR^3{}_2$, $Ge_2R^3{}_4$, $R^3{}_2SiCR^3{}_2$, $NR^1$ or $PR^1$, wherein the substituents $R^3$, same or different from each other, are $R^1$ or hydrogen, or two or four substituents $R^3$ can form one or two rings having from 3 to 6 carbon atoms; the substituents Q, same or different from each other, are hydrogen, halogen atoms, OH, SH, $R^1$, $OR^1$, $SR^1$, $NR^1{}_2$ or $PR^1{}_2$; m can be 0 or 1; n can be 0 or 1, being 1 when m=1; x is an integer comprised between m+1 and 5, preferably between (m+2) and 5; y is an integer comprised between m and 5;

(B) an organometallic aluminium compound of the formula (II):

$$AlR^4{}_{3-z}H_z \tag{II}$$

wherein the substituents $R^4$, same or different from each other, are alkyl, alkenyl or alkylaryl radicals containing from 1 to 10 carbon atoms, which may also contain Si or Ge atoms, at least one of the substituents $R^4$ being different from a straight alkyl group; z can be 0 or 1; and (C) water.

The molar ratio between the organometallic aluminium compound and water is comprised between 1:1 and 100:1, preferably, between 1:1 and 50:1.

The molar ratio between the aluminium and the metal of the cyclopentadienyl compound is comprised between about 100 and 10,000, preferably between about 500 and 5,000, more preferably between about 1,000 and 2,000.

Preferred cyclopentadienyl compounds according to the present invention are those of formula (I) in which the metal M is zirconium.

In the case of m=0, particularly suitable cyclopentadienyl compounds are those in which, the $C_5R^1{}_{x-m}H_{5-x}$ and $C_5R^1{}_{y-m}H_{5-y}$ groups are tetramethyl-cyclopentadienyl, pentamethyl-cyclopentadienyl, indenyl or 4,5,6,7-tetrahydroindenyl groups, and the substituents Q are chlorine atoms, hydrocarbyl groups containing from 1 to 7 carbon atoms, preferably methyl groups, or hydroxyl groups.

Non limitative examples of cyclopentadienyl compounds of formula (I) wherein m=0 are:

| | | |
|---|---|---|
| $(Me_3Cp)_2MCl_2$ | $(Me_4Cp)_2MCl_2$ | $(Me_5Cp)_2MCl_2$ |
| $(Me_5Cp)_2MMe_2$ | $(Me_5Cp)_2M(OMe)_2$ | $(Me_5Cp)_2M(OH)Cl$ |
| $(Me_5Cp)_2M(OH)_2$ | $(Me_5Cp)_2M(C_6H_5)_2$ | $(Me_5Cp)_2M(CH_3)Cl$ |
| $(EtMe_4Cp)_2MCl_2$ | $[(C_6H_5)Me_4Cp]_2MCl_2$ | $(Et_5Cp)_2MCl_2$ |
| $(Me_5Cp)_2M(C_6H_5)Cl$ | $(Ind)_2MCl_2$ | $(Ind)_2MMe_2$ |
| $(H_4Ind)_2MCl_2$ | $(H_4Ind)_2MMe_2$ | $\{[Si(CH_3)_3]Cp\}_2MCl_2$ |
| $\{[Si(CH_3)_3]_2Cp\}_2MCl_2$ | $(Me_4Cp)(Me_5Cp)MCl_2$ | $(Me_5Cp)MCl_3$ |
| $(Me_5Cp)MBenz_3$ | $(Ind)MBenz_3$ | $(H_4Ind)MBenz_3$ | wherein Me=methyl, Et=ethyl, Cp=cyclopentadienyl, Ind=indenyl, $H_4Ind$=4,5,6,7-tetrahydroindenyl, Benz=benzyl. M is Ti, Zr or Hf, preferably is Zr.

In the case of m=1, particularly suitable cyclopentadienyl compounds are those in which the $C_5R^1{}_{x-m}H_{5-x}$ and $C_5R^1{}_{y-m}H_{5-y}$ groups are tetramethyl-cyclopentadienyl, indenyl, 2-methyl-indenyl, 4,7-dimethyl-indenyl, 2,4,7-trimethyl-indenyl, 4,5,6,7-tetrahydroindenyl, 2-methyl-4,5,6,7-tetrahydroindenyl, 4,7-dimethyl-4,5,6,7-tetrahydroindenyl, 2,4,7-trimethyl-4,5,6,7-tetrahydroindenyl, or fluorenyl groups, $R^2$ is a $(CH_3)_2Si$ or a $C_2H_4$ divalent group, and the substituents Q are chlorine atoms, hydrocarbyl groups containing from 1 to 7 carbon atoms, preferably methyl groups, or hydroxyl groups.

Non limitative examples of cyclopentadienyl compounds of formula (I) wherein m=1 are:

| | | |
|---|---|---|
| $Me_2Si(Me_4Cp)_2MCl_2$ | $Me_2Si(Me_4Cp)_2MMe_2$ | $Me_2C(Me_4Cp)(MeCp)MCl_2$ |
| $Me_2Si(Ind)_2MCl_2$ | $Me_2Si(Ind)_2MMe_2$ | $Me_2Si(Me_4Cp)_2MCl(OEt)$ |
| $C_2H_4(Ind)_2MCl_2$ | $C_2H_4(Ind)_2MMe_2$ | $C_2H_4(Ind)_2M(NMe_2)_2$ |
| $C_2H_4(H_4Ind)_2MCl_2$ | $C_2H_4(H_4Ind)_2MMe_2$ | $C_2H_4(H_4Ind)_2M(NMe_2)OMe$ |
| $Ph(Me)Si(Ind)_2MCl_2$ | $Ph_2Si(Ind)_2MCl_2$ | $Me_2C(Flu)(Cp)MCl_2$ |
| $C_2H_4(Me_4Cp)_2MCl_2$ | $C_2Me_4(Ind)_2MCl_2$ | $Me_2SiCH_2(Ind)_2MCl_2$ |
| $C_2H_4(2\text{-MeInd})_2MCl_2$ | $C_2H_4(3\text{-MeInd})_2MCl_2$ | $C_2H_4(4,7\text{-Me}_2Ind)_2MCl_2$ |
| $C_2H_4(5,6\text{-Me}_2Ind)_2MCl_2$ | $C_2H_4(2,4,7\text{-Me}_3Ind)_2MCl_2$ | |
| $C_2H_4(3,4,7\text{-Me}_3Ind)_2MCl_2$ | $C_2H_4(2\text{-MeH}_4Ind)_2MCl_2$ | |
| $C_2H_4(4,7\text{-Me}_2H_4Ind)_2MCl_2$ | $C_2H_4(2,4,7\text{-Me}_3H_4Ind)_2MCl_2$ | |
| $Me_2Si(2\text{-MeInd})_2MCl_2$ | $Me_2Si(3\text{-MeInd})_2MCl_2$ | $Me_2Si(4,7\text{-Me}_2Ind)_2MCl_2$ |
| $Me_2Si(5,6\text{-Me}_2Ind)_2MCl$ | $Me_2Si(2,4,7\text{-Me}_3Ind)_2MCl_2$ | |
| $Me_2Si(3,4,7\text{-Me}_3Ind)_2MCl_2$ | $Me_2Si(2\text{-MeH}_4Ind)_2MCl_2$ | |
| $Me_2Si(4,7\text{-Me}_2H_4Ind)_2MCl_2$ | $Me_2Si(2,4,7\text{-Me}_3H_4Ind)_2MCl_2$ | |
| $Me_2Si(Flu)_2MCl_2$ | $C_2H_4(Flu)_2MCl_2$ | | wherein Me=methyl, Cp=cyclopentadienyl, Ind=indenyl, Flu=fluorenyl, Ph=phenyl, $H_4Ind$=4,5,6,7- tetrahydroindenyl. M is Ti, Zr or Hf, preferably is Zr.

Non limitative examples of organometallic aluminium compounds of formula (II) are:

$Al(iBu)_3$, $AlH(iBu)_2$, $Al(iHex)_3$, $Al(C_6H_5)_3$ $Al(CH_2C_6H_5)_3$, $Al(CH_2CMe_3)_3$, $Al(CH_2SiMe_3)_3$, $AlMe_2iBu$, $AlMe(iBu)_2$.

Preferably, all substituents $R^4$ of the organometallic aluminium compound are non-straight alkyl, alkenyl or alkylaryl radicals having 3 to 10 carbon atoms. More preferably, all substituents $R^4$ of the organometallic aluminium compound are isoalkyl radicals. A particularly suitable organometallic aluminium compound is the triisobutyl aluminium (TIBAL).

The components of the catalysts of the present invention can be brought into contact in different manners.

It is possible, for example, to contact the aluminium compound with water first and, thereafter, contact them with the cyclopentadienyl compound.

It is, therefore, another object of the present invention a catalyst comprising the product obtained by contacting the following components:

(A) a cyclopentadienyl compound of the formula (I):

$$(C_5R^1{}_{x-m}H_{5-x})R^2{}_m(C_5R^1{}_{y-m}H_{5-y})_nMQ_{3-n} \tag{I}$$

wherein M, $C_5R^1_{x-m}H_{5-x}$, $C_5R^1_{y-m}H_{5-y}$, $R^1$, $R^2$, Q, m, n, x, y are as defined above; and (B) the reaction product between water and an organometallic aluminium compound of the formula (II):

$$AlR^4{}_{3-z}H_z \qquad (II)$$

wherein $R^4$ and z are as defined above, at least one of the substituents $R^4$ being different from a straight alkyl group.

The molar ratio between the organometallic aluminium compound and water is comprised between 1:1 and 100:1, preferably, between 1:1 and 50:1.

Other ways to bring into contact the components of the catalysts of the present invention are possible, such as, for instance, to contact first the alkyl aluminium compound with the cyclopentadienyl compound and, thereafter, with water.

According to a particular embodiment of the invention, water can be gradually added to the alkyl aluminium compound in solution in an aliphatic or aromatic inert hydrocarbon solvent such as, for example, heptane or toluene. Thereafter, the cyclopentadienyl compound in solution in a solvent such as, for example, toluene, can be added to the previous solution.

According to another embodiment of the invention, water can be introduced into the monomer or into one of the monomers to be polymerized; in this case the alkyl aluminium compound and the cyclopentadienyl compound can be precontacted before being used in the polymerization, and then be brought into contact with the wet monomer(s).

According to a further embodiment of the invention, water can be reacted in combined form as hydrated salt, or it can be adsorbed on an inert support, such as silica.

According to a still further embodiment of the invention, the alkyl aluminium compound can be allowed to react with boric anhydride or with boric acid.

When the catalyst of the invention is used in the homo or co-polymerization of ethylene, it is particularly desirable that the components of the catalyst be contacted in such a manner that, in the catalyst, at least part of the organometallic aluminium compound is still present in its unreacted form, and is detectable with the commonly used analytic methods.

The catalysts according to the present invention can be used on inert supports. This is obtained by depositing the cyclopentadienyl compound, or the product of the reaction of this compound with the alkyl aluminium compound pre-reacted with water, or the aluminium alkyl compound pre-reacted with water, or the aluminium alkyl compound pre-reacted with water and subsequently the cyclopentadienyl compound, on inert supports such as, for example, silica, alumina, styrene-divinylbenzene copolymers or polyethylene.

The thus obtained solid compound, combined with a further addition of alkyl aluminium compound either as such or pre-reacted with water, if necessary, is usefully used in the gas phase polymerization.

As indicated above, the catalysts of the present invention can be used in the polymerization reactions of olefins.

An interesting use of the catalysts according to the present invention is for the homopolymerization of ethylene and, in particular, for the preparation of HDPE.

Another interesting use of the catalysts according to the present invention is for the copolymerization of ethylene with higher olefins.

In particular, the catalysts of the invention can be used for the preparation of LLDPE. The LLDPE copolymers which are obtained have a content of ethylene units comprised between 80 and 99% by mols. Their density is comprised between 0.87 and 0.95 g/cc and they are characterized by a uniform distribution of the alpha-olefin comonomers.

The olefins useable as comonomers comprise alpha-olefins of the formula $CH_2=CHR$ wherein R is a straight, branched or cyclic alkyl radical containing from 1 to 20 carbon atoms, and cycloolefins.

Examples of these olefins are propylene, 1-butene, 1-pentene, 4-methyl-1-pentene, 1-hexene, 1-octene, 1-decene, 1-dodecene, 1-tetradecene, 1-hexadecene, 1-octadecene, 1-eicosene, allylcyclohexane, cyclopentene, cyclohexene, norbornene 4,6-dimethyl-1-heptene.

The copolymers may also contain small proportions of units deriving from polyenes, in particular from straight or cyclic, conjugated or non conjugated dienes such as, for example, 1,4-hexadiene, isoprene, 1,3-butadiene, 1,5-hexadiene, 1,6-heptadiene.

The units deriving from the alpha-olefins of the formula $CH_2=CHR$, from the cycloolefins and/or from the polienes are present in the copolymers in amounts of from 1% to 20% by mole.

The catalyst of the invention can also be used for the preparation of elastomeric copolymers of ethylene with alpha-olefins of the formula $CH_2=CHR$, wherein R is an alkyl radical having from 1 to 10 carbon atoms, optionally containing small proportions of units deriving from polyenes.

The saturated elastomeric copolymers contain from 15% to 85% by mole of ethylene units, the complement to 100 being constituted by units of one or more alpha-olefins and/or of a non conjugated diolefin able to cyclopolymerize. The unsaturated elastomeric copolymers contain, together with the units deriving from the polymerization of ethylene and alpha-olefins, also small proportions of unsaturated units deriving from the copolymerization of one or more polyenes. The content of unsaturated units can very from 0.1 to 5% by weight, and it is preferably comprised between 0.2 and 2% by weight.

The copolymers obtainable are characterized by valuable properties such as, for example, low content of ashes and uniformity of distribution of the comonomers within the copolymeric chain.

The useable alpha-olefins comprise, for example, propylene, 1-butene, 4-methyl-1-pentene. As non conjugated diolefins able to cyclopolymerize, 1,5-hexadiene, 1,6-heptadiene, 2-methyl-1,5-hexadiene can be used. As polyenes able to give unsaturated unit, the following compounds can be used: conjugated dienes, such as butadiene and ioprene, nonconjugated dienes, such as butadiene and isoprene, non-conjugated straight dienes, such as 1,4-hexadiene trans, 1,4-hexadiene cis, 6-methyl-1,5-heptadiene, 3,7-dimethyl-1,6-octadiene, 11-methyl-1,10-dodecadiene; monocyclic diolefins such as, for example, cis-1,5-cyclooctadiene and 5-methyl-1,5-cyclooctadiene; bicylic diolefins such as, for example, 4,5,8,9-tetrahydroindene and 6- and/or 7-methyl-4,5,8,9-tetrahydroindene; alkenyl or alkyliden-norbornenes such as, for example, 5-ethyliden-2-norbornene, 5-isopropyliden-2-norbornene, exo-5-isopropenyl-2-norbornene; polycyclic diolefins, such as, for example, bicyclopentadiene, tricyclo-[6.2.1.0$^{2.7}$]-4,9-undecadiene and the 4-methyl derivative thereof.

A further interesting use of the catalysts according to the present invention is for the preparation of cycloolefin polymers. Monocyclic and polycyclic olefin monomers can be either homopolymerized or copolymerized, also with linear olefin monomers. Non limitative examples of cycloolefin polymers which can be prepared with the catalyst of the present invention are described in the European patent applications No. 501,370 and No. 407,870, the contents of which are understood to be incorporated in the present description as a result of their mention.

Polymerization processes which use the catalysts of the invention can be carried out in liquid phase, in the presence or not of an inert hydrocarbon solvent, or in gaseous phase. The hydrocarbon solvent can be either aromatic such as, for example, toluene, or aliphatic such as, for examples propane, hexeane, heptane, isobutane, cyclohexane.

The polymerization temperature generally ranges from about 0° C. to about 250° C. In particular, in the processes for the preparation of HDPE and LLDPE, it is generally comprised between 20° C. and 150° C. and, particularly, between 40° C. and 90° C., whereas for the preparation of the elastomeric copolymers it is generally comprised between 0° C. and 200° C. and, particularly, between 20° C. and 100 ° C.

The molecular weight of polymers can be varied by simply varying the polymerization temperature, the type or the concentration of the catalyst components or by using molecular weight regulators such as, for example, hydrogen.

The molecular weight distribution can be varied by using mixtures of different cyclopentadienyl compounds, or by carrying out the polymerization in many steps which differ for the polymerization temperatures and/or for the concentrations of the molecular weight regulator.

Particularly interesting results are obtained when the components of the catalyst are contacted among them before the polymerization. The contact time is generally comprised between 1 and 60 minutes, preferably between 5 and 20 minutes. The precontact concentrations for the cyclopentadienyl compound are comprised between $10^{-2}$ and $10^{-8}$ mol/l, whereas for the product of the reaction between the alkyl aluminium and water they are comprised between 10 and $10^{-3}$ mol/l. The precontact is generally carried out in the presence of a hydrocarbon solvent and, optionally, of small amounts of monomer.

The following examples are supplied for purely illustrative and not limiting purpose.

CHARACTERIZATIONS

NMR analysis of polymers have been carried out in $C_2D_2Cl_4$ at 110° C., and the butene percentage has been calculated according to the method described in "Hsieh and Randall, Macromolecules, 1982, 15, 353–360".

DSC analysis have been carried out on a DSC7 Perkin Elmer apparatus at scanning speed of 10° C./minute; values obtained on second melting are reported.

The viscosities have been measured in tetrahydronaphthalene (orthodichlorobenzene for 1,5-hexadiene polymers) at 135° C.

The distributions of molecular weights have been determined by GPC carried out by means of a WATERS 150 apparatus in orthodichlorobenzene at 135° C.

Components (A) have been synthetized as follows:

Bis(Pentamethylcyclopentadienyl)Zirconium Dichloride

The bis(pentamethylcyclopentadienyl)zirconium dichloride used has been bought from Strem.

Bis(pentamethylcyclopentadienyl)Zirconium Dimethyl

The synthesis has been carried out according to the method described in "Organometallics, 1988, 7, 818–825".

(Pentamethylcyclopentadienyl)Zirconiumtribenzyl

The synthesis has been carried our according to the method described in "Organometallics, 1982, 1, 793".

1.0453 g of $(Me_5Cp)ZrCl_3$ (Strem) were suspended in 30 ml of anhydrous ethyl ether and cooled to –78° C. By means of a syringe, 10 ml of a 1.0 molar solution of benzylmagnesium bromide in ether were added while keeping the mixture under stirring for 1 hour at –70° C. Thereafter, the temperature was raised to the room temperature and the stirring was continued for other 3 hours. Then, the mixture was dried to dryness, treated with pentane (60 ml), filtered and concentrated by evaporation up to 15 ml. Finally, a crystalline yellow solid was separated by filtration. 0.89 g of $(Me_5Cp)Zr(CH_2C_6H_5)_3$, pure from NMR analysis, were obtained.

Dimethylsilandiyl-Bis(2,3,4,5,-Tetramethylcyclopentadienyl)Zirconium Dichloride a) Preparation of tetramethylcyclopentadiene Into a 1 liter five-necked round-bottomed glass flask, equipped with mechanical stirrer, cooler, thermometer, dropping funnel and nitrogen inlet tap, 3.8 g (99.6 mmols) of $LiAlH_4$ and 200 ml of anhydrous ethyl ether were fed under nitrogen stream.

The temperature was lowered to 0° and 43,55 g (315 mmols) of 2,3,4,5-tetramethyl-cyclopenten-1-one (Aldrich) were added dropwise over 1 hour, under stirring and under light nitrogen stream.

Thereafter, the temperature was left to return to room temperature and the mixture was kept stirred for further 40 hours.

The flask was cooled to 0° C. by a ice bath; then 100 ml of water and thereafter 100 ml of 10% sulfuric acid were very slowly added; separation in two phases was obtained.

The aqueous phase was extracted three times with ether, then the organic phases were collected, washed first with a saturated solution of sodium bicarbonate then with water, and dried on anhydrous sodium sulfate.

After filtration, the ether solution was concentrated to 700 ml and introduced into a 1 liter round-bottomed flask provided with mechanical stirrer and cooler together with 6.15 g (32.3 mmols) of p-toluensulfonic monohydrate acid. This was kept under stirring for 3 hours at room temperature.

The aqueous layer formed on the bottom was removed, the ether phase was washed with 50 ml of a saturated sodium bicarbonate solution and then with water. This was dried on anhydrous sodium sulfate and, after filtration, the ether was completely evaporated. 36.8 g of tetramethylcyclopentadiene (purity=90%, yield=85%) were obtained. The compound was characterized by $^1H$-NMR.

b) Preparation of dimethylbis(tetramethylcyclopentadienyl)silane

Into a 2 liter five-necked round-bottomed glass flask, provided with mechanical stirrer, cooler, thermometer, dropping funnel and nitrogen inlet tap, 32 g (262 mmols) of tetramethylcyclopentadiene and 1200 ml of anhydrous tetrahydrofuran were fed.

The temperature was lowered to 0° C. and 165 ml of butyllithium (1.6M in hexane, 264 mmols) were added dropwise over 1.5 hour.

The mixture was kept stirred for further 10 hours, allowing the temperature to return to room temperature.

Thereafter, 17 g (132 mmols) of dichloromethylsilane dissolved in 80 ml of anhydrous tetrahydrofuran were introduced dropwise over 1 hour, at room temperature; after the addition, the whole was kept under reflux for 5 days and at the end an almost clear solution was obtained. The tetrahydrofuran was removed by evaporation under vacuum and the residue was extracted with 200 ml of petroleum ether (boiling point=40–70° C.). After filtration and evaporation of the solvent under vacuum, 36.95 g of dimethyl-bis(2,3,4,5-tetramethylcyclopentadienyl)silane were recovered. The product was characterized by $^1$H-NMR.

c) Preparation of dimethylsilandiyl-bis(2,3,4,5-tetramethyl cyclopentadienyl)zirconium dichloride The preparation method described in "Jutzi P., Dickbreder R., Chem. Ber., 1986, 119, 1750–1754" has been followed (with slight modifications).

All the operations were carried out under inert atmosphere.

A solution of 9.26 g (30.81 mmols) of dimethylbis-(2,3,4,5-tetramethyl-cyclopentadienyl)silane in 170 ml of anhydrous tetrahydrofuran was treated at 0° C. with 40.5 ml of butyllithium 1.6M in hexane. The mixture was kept stirred for 16 hours at the same temperatures and thereafter was allowed to return to room temperature while keeping under stirring for one hour.

After having completely evaporated the solvent, the residue was washed twice with 50 ml of hexane and once with pentane.

The residue was dried, thus obtaining 7.85 g of the lithium salt [Me$_2$Si(Me$_4$C$_5$)$_2$Li$_2$ (1)]. 5.98 g of the lithium salt (1) were dissolved in 80 ml of anhydrous tetrahydrofuran (THF) and were added (at 0° C. and dropwise) to a suspension of 7.22 g of ZrCl$_4$.2THF in 80 ml of tetrahydrofuran.

This was heated under reflux for 2 hours, was left to stay for overnight at room temperature and thereafter the solvent was completely evaporated. The residue was extracted twice with 70 ml of hot toluene (about 80° C.) and the solution was allowed to crystallize at –30° C.

By filtration, 1.3 g (14.7%) of crystalline product were obtained. The purity has been verified by $^1$H-NMR.

Dimethylsilandiylbis(Indenyl)Zirconium Dichloride a) Preparation of bis(indenyl)dimethylsilane In a 1 liter 3-necked round-bottomed flask, provided with funnel and nitrogen tap, 30 ml of indene (257 mmols) and 300 ml of anhydrous tetrahydrofuran were fed. The mixture was cooled to –80° C. and 170 ml of n-butyllithium (1.6M in hexane, 272 mmols) were slowly added dropwise. The mixture was allowed to return to room temperature, was kept under agitation for 3 hours and was added to a solution of 15.6 ml (129 mmols) of dichlorodimethylsilane in 200 ml of tetrahydrofuran.

After being left to react overnight, this was treated with 20 ml of water. The phases were separated, the solvent was evaporated under vacuum and the residue was treated with hexane and dried on anhydrous sodium sulfate. After having evaporated the hexane, 38.5 g of red oily product which was purified by chromatografy on silica gel (eluent=hexane) were obtained. The yield was 18.8 g (51%).

b) Preparation of dimethylsilandiyl-bis(indenyl)zirconium dichloride

The procedure described in "W. A. Heramann et al., Angew. Chem Int. Ed. Engl., 1928, 1511" has been followed.

9.4 g of bis(indenyl)dimethylsilane (32.59 mmols) dissolved in 70 ml of anhydrous tetrahydrofuran were treated at –78° C. with slow dropwise addition of 40.7 ml of n-butyllithium (1.6M in hexane, 65.2 mmols), thus obtaining a green solution. This solution was allowed to return to room temperature while keeping under stirring for one hour.

The solution, which changed to red colour, was added dropwise over about one hour and at room temperature into a suspension of 12.4 g of ZrCl$_4$.2THF (32.9 mmols) in 70 ml of anhydrous tetrahydrofuran and was left under stirring for 18 hours. An orange-yellow precipitate was formed.

The reaction mixture was reduced to half volume by evaporation of the solvent under vacuum, the precipitate was collected by filtration and washed first with a small quantity of tetrahydrofuran at –20° C. and then with some ethyl ether. The yield was 4.97 g (34%).

Ethylene-Bis(4,5,6,7-Tetrahydroindenyl)Zirconium Dichloride a) Preparation of 1,2-bis(indenyl)ethane The preparation described in "Ewen J., J. Am. Chem. Soc., 1987, 109, 6544, Suppl. mat." was carried out.

In a 2 liter 2-necked round-bottomed flask, 50.8 g of indene (437 mmols) were dissolved under inert atmosphere with 500 ml of tetrahydrofuran and cooled to –78° C. Then, 175 ml of n-butyl lithium (2.5M in hexane, 437.5 mmols) were slowly added dropwise over 1 hour. The mixture was allowed to heat up to room temperature and was kept stirred for 4 hours.

Then the mixture was cooled to –78° C. and 40.42 g of 1,2-dibromoethane (215 mmols) dissolved in 100 ml of tetrahydrofuran were added dropwise over 20 minutes. At the end of the addition the temperature was raised to 50° C. and, after stirring for 12 hours, was cooled up to room temperature and 20 ml of water were added.

The organic phase was dried and the residue was extracted with pentane.

By evaporation under vacuum 28.65 g of product were obtained. The yield was 51.6%.

b) Preparation of ethylene-bis(indenyl)zirconium dichloride

In a 250 ml two-necked round-bottomed flask, provided with cooler, 8 g (31 mmols) of 1.2-bisindenylethane and 100 ml of anhydrous tetrahydrofuran were fed, thus obtaining a yellow solution.

After cooling to –78° C., 40 ml of n-butyllithium (1.6M in hexane, 64 mmols) were added dropwise in the solution thus obtaining a precipitate which, by heating, dissolves again giving a reddish-yellow solution.

In a 250 ml four-necked round-bottomed flask provided with cooler, 8.67 g of ZrCl$_4$ (37.2 mmols) were introduced. After cooling to –196° C., 50 ml of tetrahydrofuran were condensed in it (very stark exothermic reaction). This was left to reach room temperature and then was heated under reflux for 40 minutes.

At room temperature and whilst stirring the solution of the lithium salt of the bisindenylethane was added to the solution of the adduct ZrCl$_4$/THF and the mixture was kept stirred for 20 hours in the dark.

At 0° C. gaseous HCl was bubbled in, thus obtaining a yellow solution together with a precipitate of the same colour. The solution was concentrated under vacuum by evaporating a part of the solvent, it was cooled to –20° C. and filtered off.

The precipitate was further purified by extraction with dichloromethane, thus obtaining 2.3 g (14.7%) of product.

c) Preparation of ethylene-bis(4,5,6,7-tetrahydroindenyl) zirconium dichloride

The method of preparation described in "F.R.W.P. Wild, M. Wasiucionek, G. Huttner and H. H. Brintzinger, J. Organomet. Chem. 288, 1985, 63" was followed.

A suspension of 1 g of ethylene-bis(indenyl)zirconium dichloride (2.4 mmols) and 80 mg of PtO$_2$ in 25 ml of CH$_2$Cl$_2$ was hydrogenated in autoclave under 100 bar H$_2$ for half an hour at room temperature. The reaction mixture was diluted with 500 ml of CH$_2$Cl$_2$, was filtered off and the solvent was evaporated under vacuum.

The residues after having been washed with pentane, was recrystallized from hot toluene. 640 mg (64%) of product were thus obtained.

Preparation of Bis(Indenyl)Zirconium Dichloride

All the operations were carried out under inert atmosphere.

7.0 ml of indene (60 mmols) were dissolved in 20 ml of anhydrous tetrahydrofuran, the solution was cooled to −78° C. and was treated with 40.0 ml of n-butyllithium (1.5M in hexane, 60 mmols). This was heated to room temperature, thus obtaining a red coloured solution.

In a 100 ml round-bottomed flask provided with reflux cooler, 7 g of $ZrCl_4$ (30 mmols) were cooled to −78° C. and treated with 30 ml of tetrahydrofuran (exothermic reaction). Thereafter, the whole was heated under reflux for 30 minutes, until a clear, brown coloured solution was obtained.

The solution of indenyl lithium was added, at room temperature, to the solution of the $ZrCl_4$/THF adduct. It was kept stirring for 2 hours (a yellow suspension was formed) and thereafter the solvent was completely evaporated.

The residue was suspended in ethyl ether, was filtered off, washed repeatedly with ether and extracted with dichloromethane.

The solution was dried and the product was washed with ether and then with pentane: 4.35 g of bisindenylzirconium dichloride were thus obtained (36.8%).

Ethylene-Bis(4,7-Dimethyl-1-Indenyl)Zirconium Dichloride a) Preparation of 4,7-dimethylindene The synthesis has been carried out according to the method described in "Organometallics, 1990, 9, 3098" (54% yield from p-xylene).

b) Preparation of 1,2-bis(4,7-dimethyl-3-indenyl)ethane 38.2 g (265 mmol) of 4,7-dimethylindene was dissolved in 350 ml of tetrahydrofuran and the solution was cooled to 0° C. Then 165 ml of n-butyllithium (1,6M in hexane, 264 mmol) was added dropwise over 2.5 hours. After warming to room temperature and stirring for 4 hours a purple solution of 4,7-dimethylindenyl-lithium was obtained. This solution was cooled to −70° C. and treated dropwise with 25,3 g of 1,2-dibromoethane (135 mmol) in 15 ml of tetrahydrofuran over 35 min. After warming to room temperature, a pale yellow solution was obtained, and then water was added. The organic phase was collected and dried over $Na_2SO_4$. The solvent was removed by vacuum evaporation to provide 20 g of crude product (48% yield).

c) Preparation of rac- and meso- ethylene-bis(4,7-dimethyl-1-indenyl)zirconium dichloride A suspension of 10 g of 1,2-bis(4,7-dimethyl-3-indenyl) ethane (31.8 mmol) in 80 ml of tetrahydrofuran was added via cannula to a stirred suspension of 2,82 g of KH (70.3 mmol) in 160 ml of tetrahydrofuran.

After hydrogen generation had subsided, the resulting brownish solution was separated from excess KH. This solution and a solution of 12 g of $ZrCl_4(THF)_2$ (31.8 mmol) in 250 ml of tetrahydrofuran were both added dropwise via cannula to a flask containing 50 ml of rapidly stirring tetrahydrofuran over 3 hours.

A yellow solution and a precipitate formed. After removing the solvent in vacuo, the orange-yellow residue (mixture of racemic and meso isomers 2.33:1 by $^1$H NMR) was extracted with $CH_2Cl_2$ until all orange product had dissolved. The 1.7 g of yellow solid resulted to be a single stereoisomer, namely the meso (11.3% yield).

Evaporation of $CH_2Cl_2$ from the orange solution gave 4.9 g of an orange solid corresponding to a mixture of 93.7% racemic and 6.3% meso isomers (32.5% yield). This solid was then recrystallized in toluene at −20° C.

EXAMPLE 1

Polymerization of ethylene with $(Me_5Cp)_2ZrCl_2$ in toluene

Into a 1 liter glass Buchi autoclave equipped with magnetic stirrer and thermostated at 50° C., 400 ml of toluene were introduced under nitrogen atmosphere. The nitrogen was removed by saturating with ethylene at 1 atm. In 10 ml of toluene, 16.2 mg of ($Me_5Cp)ZrCl_2$ were dissolved and 0.06 ml of this solution was added to 10 ml of toluene solution of the reaction product between triisobutyl aluminium and water containing 2.04 mmols of Al and 1.70 mmols of water (molar ratio $Al/H_2O$=1.2; molar ratio Al/Zr= 9000). After a five minute aging the solution was injected in the autoclave under ethylene flow. The polymerization was carried out at 50° C. and under 4 atm of ethylene for 1 hour, yielding 6.63 g of polymer (I.V.=9.90 dl/g).

EXAMPLE 2

Polymerization of ethylene with $(Me_5Cp)_2ZrCl_2$ in toluene

The same procedure described in Example 1 was carried out, except that the catalyst solution was prepared as follows. 12.8 mg of $(Me_5Cp)_2ZrCl_2$ were dissolved in 10 ml of toluene and 0.08 ml of this solution was added to 10 ml of toluene solution of the reaction product between triisobutyl aluminium and water containing 2.04 mmols of Al and 0.68 mmols of water (molar ratio $Al/H_2O$=3; molar ratio Al/Zr= 8650). 7.78 g of polymer were obtained (I.V.=6.18 dl/g).

EXAMPLES 3–6

Polymerization of ethylene with $Me_2Si(Me_4Cp)_2ZrCl_2$ in propane

Into a 4.25 liter steel autoclave, equipped with magnetic stirrer, 2 liter of liquid propane, and the quantity of water reported in Table 1 were introduced under nitrogen atmosphere. Then, a solution of 3.4 mmols of aluminium triisobutyl in 10 ml of toluene and 1.00 mg of $Me_2Si(Me_4Cp)_2ZrCl_2$ were introduced. After 5 minutes in the absence of the monomer, the autoclave was thermostated at 50° C. and ethylene was fed under a pressure of 7.1 absolute atm for 2 hours.

Results are reported in Table 1.

EXAMPLE 7

Polymerization of ethylene with $Me_2Si(Me_4Cp)_2ZrCl_2$ in propane

In a 4.25 l. steel autoclave equipped with a blade stirrer, 2.75 l. of liquid propane were introduced under anhydrous nitrogen atmosphere. The temperature was raised at 50° C. and 10 ml of a toluene solution of TIBAL (4.5 mmol) to which 2.25 mmol of water had been added (reaction time=30 min; reaction temperature=0° C.; $Al/H_2O$ molar ratio=2.0) precontacted with 1.00 mg of $Me_2Si(Me_4Cp)_2ZrCl_2$ for 5 minutes in the absence of monomers (Al/Zr molar ratio= 2.073), were introduced. Thereafter ethylene was fed under a pressure of 8.1 absolute atm for 2 hours. After removal of the unreacted monomers, the polymer was separated by washing with methanol and drying under vacuum, thus recovering 16 g of polymer (I.V.=2.93 dl/g).

EXAMPLE 8

Polymerization of ethylene with $Me_2Si(Me_4Cp)_2ZrCl_2$ in propane

The same procedure described in Example 7 was carried out, but with the difference that 0.45 mmol of water were used ($Al/H_2O$ molar ratio=10.0). 100 g of polymer were obtained (I.V.=0.95 dl/g).

EXAMPLE 9

Polymerization of ethylene with $Me_2Si(Me_4Cp)_2ZrCl_2$ in propane

The same procedure described in Example 7 was carried out, but with the difference that 0.3 mmol of water were used (Al/H₂O molar ratio=15.0). 60 g of polymer were obtained (I.V.=0.93 dl/g).

EXAMPLES 10–14
Polymerization of ethylene with Me₂Si(Me₄Cp)₂ZrCl₂ in hexane

Into a 1 liter glass autoclave, equipped with magnetic stirrer, 0.4 l of hexane (containing 2 ppm water) and the quantities of water reported in Table 2 were introduced under nitrogen atmosphere. Then, 1.8 ml of a 1M toluene solution of aluminium triisobutyl and the quantities of Me₂Si(Me₄Cp)₂ZrCl₂ indicated in Table 2 were introduced. After 5 min in the absence of monomers, the autoclave was thermostated at 50° C. and ethylene was fed at a pressure of 4 absolute atm. for 1 hour.

Results are reported in Table 2.

Comparison Example A

The same procedure described in Examples 10–14 was carried out, but using methylalumoxane (MAO) instead of TIBAL and water.

A commercial MAO (Schering, MW 1400) in 30% by weight toluene solution was used. After removal of the volatile fractions under vacuum, the glassy material was crushed until a white powder was obtained. This powder was treated under vacuum (0.1 mm Hg) at a temperature of 40° C. during 4 hours. 0.89 mmol of the resulting powder were used.

Results are reported in Table 2.

EXAMPLE 15
Polymerization of ethylene with rac-C₂H₄(4,7-Me₂-1-Ind)₂ZrCl₂ in propane In a 4.25 l steel autoclave equipped with blade stirrer, 1.8 l of liquid propane were introduced under anhydrous nitrogen atmosphere. The temperature was raised at 50° C. and a toluene solution of TIBAL (2.1 mmol) to which 1.05 mmol of water had been added (reaction time=30 min; reaction temperature=0° C.; Al/H₂O molar ratio=2.0), precontacted with 1.0 mg of rac-C₂H₄(4,7-Me₂-1-Ind)₂ZrCl₂ for 5 minutes in the absence of monomers (Al/Zr molar ratio=1,000), was introduced. Thereafter ethylene was fed under a pressure of 8.1 absolute atm for 2 hours. After removal of the unreacted monomers, the polymer was separated by washing with methanol and drying under vacuum, thus recovering 107 g of polymer (I.V.=2.2 dl/g).

EXAMPLE 16
Polymerization of ethylene with (Me₅Cp)Zr(CH₂C₆H₅)₃ in toluene

Into a 250 ml glass autoclave equipped with magnetic stirrer and thermostated at 50° C., 90 ml of toluene were introduced under nitrogen atmosphere. The nitrogen was removed by saturating with ethylene at 1 atm. Then 1.1 mg of (Me₅Cp)Zr(CH₂C₆H₅)₃ and an amount of the reaction product between AliBu₃ and water (molar ratio Al/H₂O=1.63) such to have a molar ratio Al/Zr=1000 were dissolved in 10 ml of toluene. After a 5 minute aging, the solution was injected into the autoclave under ethylene flow. The polymerization was carried out at 50° C., under a pressure of 4 bar-g of ethylene for 1 hour, yielding 2.5 g of polyethylene (I.V.=8.14 dl/g).

EXAMPLE 17
Ethylene/propylene copolymerization with (Me₅Cp)Zr(CH₂C₆H₅)₃ in toluene The same procedure described in Example 16 was carried out, but using an ethylene/propylene mixture (ratio C₃/C₂=5) which was continuously fed with a 0.5 l/h discharge flow. 2.45 g of copolymer were obtained, containing 30% by mole of propylene (I.V.=1.99 dl/g). The melting temperature ($T_m$) is 73.8° C.

EXAMPLES 18–24 AND COMPARISON EXAMPLE B
Ethylene/propylene copolymerization in toluene In a 250 ml glass autoclave, equipped with magnetic stirrer, thermostated at 50° C., 2.2 mmols of aluminium alkyl in 90 cc of toluene containing 0.55 mmols of H₂O and 0.0022 mmols of metallocene dissolved in 10 ml of anhydrous toluene were introduced under anhydrous nitrogen. After 5 minutes, in the absence of monomers, under a pressure of 5 absolute atmospheres, a mixture of ethylene and propylene in the desired quantities was fed. The monomer mixture was continuously introduced in the autoclave whilst stirring during the whole duration of the test, and the gaseous mixture was continuously discharged at a rate of 0.5 liter/minute. At the end the catalyst was deactivated by injecting 1 ml of methanols, the solution of the polymer was washed with 10 ml of 0.5N HCl and the polymer was precipitated with methanol. The polymer was filtered and dried under vacuum until constant weight.

Results are reported in Table 3. The characterization of the obtained polymers is reported in Table 4.

EXAMPLE 25
Ethylene/propylene copolymerization with C₂H₄(H₄Ind)₂ZrCl₂ in liquid propylene In a 2 liter stainless steel autoclave, 480 g of propylene containing 1.2 mmols of H₂O were introduced and the temperature was raised to 50° C. Thereafter, ethylene was fed until an overpressure of 7.5 atm was reached and a solution of 0.0047 mmols of C₂H₄(H₄Ind)₂ZrCl₂ and 9.5 mmols of AliBu₃ in 10 ml of toluene, precontacted for 8 minutes, was introduced. The ethylene overpressure was kept constant during the whole test, keeping under stirring at 52° C. for 1 hour. After removal of unreacted monomers and drying, 150 g amorphous polymer were obtained (I.V. =2.37 dl/g). The propylene content, determined by IR analysis, is 39% by mols.

EXAMPLE 26
Ethylene/butene copolymerization with C₂H₄(H₄Ind)₂ZrCl₂ in liquid butene In a 1 liter stainless steel autoclave, 255 g of butene were introduced, the temperature was raised to 50° C. and a solution obtained by mixing 0.16 ml of $4.34 \cdot 10^{-3}$M toluene solution of C₂H₄(H₄Ind)₂ZrCl₂ and 2.45 ml of 0.4M toluene solution of AliBu₃ in 7.5 ml of toluene containing 1.12 mmols of H₂O precontacting the two solutions for 5 minutes, was introduced. Thereafter ethylene was fed until an overpressure was reached of 4 atm. which was maintained constant, whilst stirring for 1 hour at 50° C. After removal of the unreacted monomer and drying, 7.90 g of amorphous polymer were obtained (I.V.=2.96). The butene content, determined by $^{13}$C NMR analysis, is 29.1% by mols.

EXAMPLE 27
Ethylene/propylene/ethylidennorbornene terpolymerization with C₂H₄(H₄Ind)₂ZrCl₂ in liquid butene The same procedure described in Example 25 was carried out, but adding 10 ml of 2-ethyliden-norbornene (ENB). The polymerization was carried out at 51° C. for 45 minutes. After the removal of unreacted monomers and drying of the polymer, 76 g of amorphous terpolymer, containing 45.0% of propylene, 53.7% of ethylene and 1.3% of ENB (by mole) were obtained (I.V.=1.62 dl/g).

EXAMPLES 28–30
Ethylene/propylene copolymerization with $Me_2Si(Me_4Cp)_2ZrCl_2$ in toluene In a 250 ml glass autoclave, equipped with magnetic stirrer, thermostated to a constant polymerization temperature 2.2 mmols of aluminium alkyl dissolved in 90 ml of toluene containing 0.55 mmol of water and 0.0022 mmol of the metallocene dissolved in 10 ml of anhydrous toluene were introduced under anhydrous nitrogen atmosphere. After 5 minutes in the absence of monomers, a mixture of ethylene and propylene in the desired ratio was fed under 5 absolute atmosphere pressure. The monomer mixture was continuously introduced in the autoclave under agitation during the whole test, and the gaseous mixture was continuously discharged at the rate of 0.5 liter/minute, while keeping the temperature constant. At the end the catalyst was deactivated by injecting 1 ml of methanol, the polymer solution was washed with 10 ml of 0.5N HCL and the polymer was precipitated with methanol. The polymer was filtered and dried under vacuum until constant weight.

Results are reported in Table 5. The characterization of the obtained polymers is reported in Table 6.

EXAMPLES 31–32
Ethylene/butene copolymerization in liquid butene

In a 1 liter steel autoclave, the desired quantity of 1-butene was introduced. The temperature was raised to 50° C. and 10 ml of toluene were introduced, in which the quantities indicated in Table 7 of metallocene, $AliBu_3$ and $H_2O$ have been dissolved. Ethylene was then fed until the desired overpressure, which was then maintained constant during the whole test, carried out whilst keeping stirred at 50° C. for 1 hour. After removal of the unreacted monomers, the polymer was separated by washing with methanol and drying under vacuum.

Results are reported in Table 7. The characterization of the obtained polymers is reported in Table 8.

EXAMPLE 33
Ethylene/propylene/isoprene terpolymerization with $Me_2Si(Me_4Cp)_2ZrCl_2$ in toluene In a 250 ml glass autoclave, equipped with magnetic stirrer, kept at the constant temperature of 50° C., 2.2 mmole of $AliBu_3$ dissolved in 90 cc of toluene containing 0.55 mmole of $H_2O$ and 0,0022 mmols of dimethylsilandiyl-bis(tetramethyl cyclopentadienyl)zirconium dichloride dissolved in 10 ml of anhydrous toluene were introduced under anhydrous nitrogen. After 5 minutes in the absence of monomers, a mixture of ethylene and propylene in the desired ratio was fed under a pressure of 5 absolute atmospheres and immediately after 5 ml of isoprene were added. The monomer mixture was continuously introduced in the autoclave whilst stirring during the whole test, continuously discharging the gaseous mixture at the rate of 0.5 l/minute. At the end the catalyst was deactivated by injecting 1 ml of methanol. The polymer solution was washed with 10 ml of 0.5N HCl and the polymer was precipitated with methanol. The polymer was filtered and dried under vacuum until constant weight, yielding 0.35 g of terpolymer, which contains (molar values) 6.6% propylene, 89.6% ethylene and 3.8% isoprene, as from the $^1H$ NMR analysis.

EXAMPLE 34
Ethylene/propylene/cis-1,4-hexadiene terpolymerization with $Me_2Si(Me_4Cp)_2ZrCl_2$ in toluene In a 250 ml glass autoclave resistant to pressure, equipped with magnetic stirrer, kept at the constant temperature of 50° C., 2.2 mmol of $AliBu_3$ dissolved in 90 cc of toluene containing 0.55 mmol of $H_2O$ and 0.0022 mmol of dimethylsilandiylbis(tetramethyl cyclopentadienyl)zirconium dichloride dissolved in 10 ml of anhydrous toluene were introduced under anhydrous nitrogen. After 5 minutes in the absence of monomer, an ethylene/propylene mixture in the desired ratio was fed under 5 absolute atmosphere pressure and, immediately after, 5 ml of cis-1,4-hexadiene were added. The monomer mixture was continuously introduced in the autoclave whilst stirring during the whole test, while continuously discharging the gaseous mixture at the rate of 0.5 l/min. At the end the catalyst was deactivated by injecting 1 ml of methanol, the polymer solution was washed with 10 ml of 0.5N HCl and the polymer was precipitated with methanol. The polymer was filtered and dried until constant weight, yielding 1.6 g of terpolymer containing (molar value) 6.33% propylene, 93.31% ethylene and 0.36% hexadiene, as from $^1H$ NMR analysis.

EXAMPLE 35
Propylene polymerization with $(Me_5Cp)_2ZrMe_2$ in toluene

Into a 250 ml glass autoclave equipped with magnetic stirrer and kept at the constant temperature of 20° C., 10 ml of toluene were introduced under nitrogen atmosphere. Then, 5.87 mg of $(Me_5Cp)_2ZrMe_2$ were dissolved in further 5 ml of toluene and to this solution 5 ml of toluene containing 2.23 g of the reaction product between $AliBu_3$ and water (molar ratio $Al/H_2O=1.63$) were added in order to have a molar ratio $Al/Zr=1,000$. After a 5 minutes aging, the solution was injected into the autoclave under propylene atmosphere. The polymerization was carried out at 20° C., under 4 atm of propylene, for 4 hours, yielding 8 ml of propylene oligomers.

EXAMPLES 36–40
Polymerization of 1,5-hexadiene with $(Me_5Cp)_2ZrMe_2$ a) Preparation of the isobutyl alumoxanes Into a 250 ml three-necked glass reactor, provided with magnetic stirrer, cooler, dropping funnel and nitrogen inlet tap, 29.32 g of triisobutyl aluminium (TIBAL) freshly distilled and free of hydrides were fed under nitrogen stream and then 84.85 g of anhydrous toluene were added.

In an evaporator connected with the nitrogen flow, the amount of water indicated in Table 9 was fed. The TIBAL solution was cooled to 0° C. whilst stirring, and nitrogen was circulated by means of a membrane compressor for 150 minutes. Thereafter, a 20 ml sample of the solution (sample A) was taken.

By working in the same manner, the subsequently water additions indicated in Table 9 were carried out and the corresponding solution samples were taken (samples B–E).

b) Polymerization of 1,5-hexadiene

Into a 100 ml glass test tube, 1.95 mg of $(Me_5Cp)_2ZrMe_2$, 16.3 ml of toluene and 3.7 ml of the 1.35M toluene solution of the reaction product between $AliBu_3$ and water with molar ratio between $AliBu_3$ and water equal to 3 (sample A) were introduced under nitrogen. After 5 minutes, 20 ml of 1,5-hexadiene were added and this was reacted for 4 hours at 20° C.

The same operations were then repeated using reaction products between $AliBu_3$ and water in different molar ratios (samples B–E).

The yields and characterizations of the polymers obtained are reported in Table 9.

EXAMPLE 41
Ethylene/2-norbornene copolymerization with $C_2H_4(H_4Ind)_2ZrCl_2$ in toluene/hexane Into a 100 ml glass Schlenk tube equipped with magnetic stirrer, 70 ml of toluene and 1.80 g of TIBA were introduced. After 5 minutes, 0.0816 ml of water were added (molar ratio $Al/H_2O=2$). The solution was left for 20 minutes under stirring. Then, 4.71 g of 2-norbornene in 25 ml of hexane were injected into the tube by means of a syringe. Then, the solution contained into the tube was metered, under ethylene flow, into a 250 ml glass autoclave equipped with magnetic stirrer, which had been flushed with nitrogen and then with ethylene. After 5 minutes, the nitrogen was removed and the autoclave was saturated with 1 ata of ethylene. Parallel to this, 3.87 mg of $C_2H_4(H_4Ind)_2ZrCl_2$ were dissolved in 5 ml of toluene. This solution was then metered into the autoclave (molar ratio Al/Zr=1,000). The autoclave was kept at 22° C. for 1 hour under stirring. The contents of the autoclave were then discharged, filtered, and the solid was treated with a mixture of two parts of ethanol and 1 part of hydrocloric acid during 1 hour. The solid was then filtered off, washed with water until pH neutral and dried at 50° C. under vacuum for 8 hours. 3.2 g of an amorphous polymer were recovered.

EXAMPLE 42

Ethylene/2-norbornene copolymerization with $C_2H_4$ $(H_4Ind)_2ZrCl_2$ in toluene/hexane The same procedure described in Example 41 was carried out, except that 62.5 ml of toluene and 1.80 g of TIBAL were introduced into the Schlenk tube and that, afterwards, 7.06 g of 2-norbornene in 37.5 ml of hexane were injected into the tube. 2.6 g of amorphous polymer were recovered. The glass transition temperature ($T_g$) is 59.6° C.

As used in the tables, the following symbols have the meanings set forth below:

"n.d." means "not determined";
"$T_p$" means "polymerization temperature";
"$t_p$" means "time of polymerization reaction";
"$T_m$" means "melting temperature";
"$\Delta H_f$" means "heat of fusion".

TABLE 2

Ethylene polymerization with $Me_2Si(Me_4Cp)_2ZrCl_2/AliBu_3/H_2O$ in hexane

| Example | Zr (µmol) | H₂O (mmol) | Al/O (mol) | Al/Zr (mol) | yield (g) | activity (Kg$_{PE}$/g$_{Zr}$/h) | I.V. (dl/g) |
|---|---|---|---|---|---|---|---|
| 10 | 0.21 | — | — | 8,500 | 3.3 | 170 | 3.64 |
| 11 | 0.22 | 0.18 | 10 | 8,200 | 21.1 | 1,045 | 3.95 |
| 12 | 0.22 | 0.36 | 5 | 8,200 | 22.2 | 1,112 | 4.14 |
| 13 | 0.25 | 0.90 | 2 | 7,300 | 24.5 | 1,048 | 3.62 |
| 14 | 0.21 | 1.80 | 1 | 8,500 | 18.0 | 928 | 3.33 |
| COMP.A | 0.10 | 0.89 | 1 | 8,000 | 4.0 | 408 | 3.10 |

I.V. = intrinsic viscosity

TABLE 3

Ethylene/propylene copolymerization - synthesis

| Example | Catalyst | Al/O (mol) | $T_p$ (° C.) | feeding $C_3/C_2$ (mol) | $t_p$ (min) | activity (Kg$_p$/g$_{Zr}$/h) |
|---|---|---|---|---|---|---|
| 18 | Me₂Si(Me₄Cp)₂ZrCl₂/AliBu₃/H₂O | 4 | 50 | 7 | 60 | 16.5 |
| 19 | " | 4 | 60 | 7 | 90 | 17.5 |
| 20 | " | 4 | 50 | 10 | 135 | 11.1 |
| 21 | " | 4 | 50 | 15 | 120 | 7.3 |
| 22 | Me₂Si(Ind)₂ZrCl₂/AliBu₃/H₂O | 4 | 50 | 2 | 90 | 16.0 |
| 23 | C₂H₄(H₄Ind)₂ZrCl₂/AliBu₃/H₂O | 4 | 50 | 2 | 60 | 30.5 |
| 24 | C₂H₄(H₄Ind)₂ZrCl₂/AliEs₃/H₂O | 4 | 50 | 2 | 120 | 11.5 |
| COMP. B | C₂H₄(H₄Ind)₂ZrCl₂/AlEt₃/H₂O | 4 | 50 | 2 | 120 | 1.6 |

Me = methyl, Me₄Cp = 2,3,4,5-tetramethylcyclopentadenyl, Ind = indenyl, H₄Ind = 4,5,6,7-tetrahydroindenyl

TABLE 1

Ethylene polymerization with $Me_2Si(Me_4Cp)_2ZrCl_2/AliBu_3/H_2O$ in propane

| Example | Zr (µmol) | H₂O (mmol) | Al/O (mol) | Al/Zr (mol) | yield (g) | activity (Kg$_{PE}$/g$_{Zr}$/h) | I.V. (dl/g) |
|---|---|---|---|---|---|---|---|
| 3 | 2.2 | 2.27 | 1.5 | 1,566 | 75 | 189.4 | 2.54 |
| 4 | 2.2 | 1.13 | 3.0 | 1,566 | 68 | 171.7 | 1.17 |
| 5 | 2.2 | 0.45 | 7.6 | 1,566 | 72 | 181.8 | 1.21 |
| 6 | 2.2 | 0.30 | 11.3 | 1,566 | 5 | 12.6 | n.d. |

I.V. = intrinsic viscosity

TABLE 4

Ethylene/propylene copolymerization - characterization

| Example | % C₃ - I.R. (mol) | I.V. (dl/g) | $T_m$ (° C.) | $\Delta H_f$ (J/g) |
|---|---|---|---|---|
| 18 | 16.5 | 1.74 | 64.4 | 6.3 |
| 19 | 22.2 | 1.28 | amorphous | — |
| 20 | 18.0 | 1.58 | 70.5 | 15.5 |
| 21 | 33.0 | 1.02 | amorphous | — |
| 22 | 25.0 | 1.0 | amorphous | — |
| 23 | 29.5 | 1.65 | amorphous | — |
| 24 | 30.3 | 1.93 | 44.7 | 2.5 |
| COMP. B | 16.0 | 0.50 | 39.0 | 9.2 |

I.V. = inherent viscosity

TABLE 5

Ethylene/propylene copolymerization - synthesis

| Example | Catalyst | Al/O (mol) | $T_p$ (° C.) | feeding $C_3/C_2$ (mol) | $t_p$ (min) | activity ($Kg_p/g_{Zr}/h$) |
|---|---|---|---|---|---|---|
| 28 | Me$_2$Si(Me$_4$Cp)$_2$ZrCl$_2$/AliBu$_3$/H$_2$O | 4 | 20 | 1 | 15 | 44.0 |
| 29 | " | 4 | 50 | 1 | 15 | 34.6 |
| 30 | " | 4 | 50 | 5 | 90 | 12.5 |

Me = methyl, Me$_4$Cp = 2,3,4,5-tetramethylcyclopentadienyl

TABLE 6

Ethylene/propylene copolymerization - characterization

| Example | % C$_3$ - $^{13}$C NMR (mol) | I.V. (dl/g) | $T_m$ (° C.) | $\Delta H_f$ (J/g) |
|---|---|---|---|---|
| 28 | 2.38 | 2.92 | 115.6 | 130.8 |
| 29 | 2.50 | n.d. | 114.7 | 82.2 |
| 30 | 6.70 | 2.11 | 101.3 | 55.3 |

I.V. = inherent viscosity

TABLE 7

Ethylene/butene copolymerization - synthesis

| Example | Catalyst | Al/O (mol) | C$_4$ (g) | P$_{C2}$ (atm) | Zr (mmol · 10$^{-4}$) | Al (mmol) | activity ($Kg_p/g_{Zr}/h$) |
|---|---|---|---|---|---|---|---|
| 31 | Me$_2$Si(Me$_4$Cp)$_2$ZrCl$_2$/AliBu$_3$/H$_2$O | 6 | 260 | 4 | 6.51 | 2.33 | 860.5 |
| 32 | C$_2$H$_4$(H$_4$Ind)$_2$ZrCl$_2$/AliBu$_3$/H$_2$O | 6 | 260 | 20 | 4.74 | 2.48 | 513.5 |

Me = methyl, Me$_4$Cp = 2,3,4,5-tetramethylcyclopentadienyl, H$_4$Ind = 4,5,6,7-tetrahydroindenyl

TABLE 8

Ethylene/butene copolymerization - characterization

| Example | % C$_4$ - $^{13}$C NMR (mol) | I.V. (dl/g) | $T_m$ (° C.) | $\Delta H_f$ (J/g) | density (g/cc) |
|---|---|---|---|---|---|
| 31 | 6.4 | 3.46 | 89.9 | 36.8 | 1.899 |
| 32 | n.d. | n.d. | 66.0 | 19.0 | 1.885 |

I.V. = inherent viscosity

TABLE 9

1,5-hexadiene polymerization - characterization

| Example | Sample | H$_2$O ml | H$_2$O mmol | Al/H$_2$O (mol) | diene | yield (g) | activity ($g_{POL}/g_{Zr}$) | $T_m$ (° C.) | $\Delta H_f$ (J/g) | I.V. (dl/g) |
|---|---|---|---|---|---|---|---|---|---|---|
| 36 | A | 0.912 | 50.65 | 3 | 20 | 0.45 | 980 | 179.6 | 42.1 | 0.40 |
| 37 | B | 0.255 | 14.15 | 2.25 | 20 | 0.85 | 1,860 | 178.3 | 40.3 | 0.45 |
| 38 | C | 0.103 | 5.7 | 2 | 20 | 1.36 | 2,980 | 177.7 | 42.2 | 0.41 |
| 39 | D | 0.234 | 13 | 1.5 | 20 | 7.07 | 15,500 | 177.0 | 43.1 | 0.35 |
| 40 | E | 0.165 | 9.13 | 1.2 | 20 | 8.75 | 19,200 | 175.4 | 41.9 | n.d. |

I.V. = inherent viscosity

We claim:

1. A catalyst for the polymerization of olefins comprising the product obtained by contacting the following components:

(A) a cyclopentadienyl compound of the formula (I):

$$(C_5R^1_{x-m}H_{5-x})R^2_m(C_5R^1_{y-m}H_{5-y})_nMQ_{3-n} \qquad (I)$$

wherein M is a metal selected from the group consisting of Ti, Zr and Hf; $C_5R^1_{x-m}H_{5-x}$ and $C_5R^1_{y-m}H_{5-y}$, which are the same or different from each other, are cyclopentadienyl rings; wherein the substituents $R^1$ are the same or different from each other, and are selected from the group consisting of Si(CH$_3$)$_3$, alkyl, alkenyl, aryl, alkylaryl and arylalkyl radicals, said radicals having from 1 to 20 carbon atoms and optionally having Si or Ge atoms, or wherein one pair of $R^1$ substituents of the same cyclopentadienyl group forms a ring having from 4 to 6 carbon atoms and the other $R^1$ substituents are as defined above, or wherein two pairs of $R^1$ substituents of the same cyclopentadienyl group form two rings having from 4 to 6 carbon atoms; wherein $R^2$ is a bridging group which links the two cyclopentadienyl rings and is selected from the group consisting of $CR^3_2$, $C_2R^3_4$, $SiR^3_2$, $Si_2R^3_4$, $GeR^3_2$, $Ge_2R^3_4$, $R^3_2SiCR^3_2$, $NR^1$ and $PR^1$ wherein the $R^3$ substituents, which are the same or different from each other, are selected from the group consisting of $R^1$ and hydrogen, or wherein one pair of the $R^3$ substituents forms a ring having from 3 to 6 carbon atoms, or two pairs of the $R^3$ substituents form two rings having from 3 to 6 carbon atoms; the Q substituents, which are the same or different from each other, are selected from the group consisting of hydrogen, halogen, OH, SH, $R^1$, $OR^1$, $SR^1$, $NR^1_2$ and $PR^1_2$; m is 0 or 1; n is 0 or 1, n being 1 when m=1; x is an integer of from m+1 to 5; and y is an integer of from m to 5:

(B) an organometallic aluminium compound of the formula (II):

$$AlR^4{}_{3-z}H_z \qquad (II)$$

wherein the $R^4$ substituents, which are the same or different from each other, are selected from the group consisting of alkyl, alkenyl and alkylaryl radicals containing from 1 to 10 carbon atoms, said radicals optionally containing Si or Ge atoms, with the proviso that at least one of the $R^4$ substituents is different from a straight alkyl group; z is 0 or 1; and (C) water:

the molar ratio of the organometallic aluminium compound to the water being from 1:1 to 100:1, with the proviso that contacting the organometallic aluminium compound with the water results in an aluminium reaction product in which at least a part of said aluminium reaction product is in a form different from an alumoxane compound of formula (III):

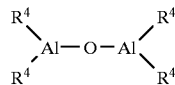

(III)

wherein the $R^4$ substituents, which are the same or different from each other, are as defined above.

2. The catalyst according to claim 1, wherein the molar ratio between the aluminium of the organometallic aluminium compound and the metal M of the cyclopentadienyl compound is from about 100:1 to 10,000:1.

3. The catalyst according to claim 1, wherein the metal M in the cyclopentadienyl compound of the formula (I) is zirconium.

4. The catalyst according to claim 1, wherein in the cyclopentadienyl compound of the formula (I), m is=0, and the $C_5R^1{}_{x-m}H_{5-x}$ and $C_5R^1{}_{y-m}H_{5-y}$ groups are selected from the group consisting of tetramethylcyclopentadienyl, pentamethyl-cyclopentadienyl, indenyl and 4,5,6,7-tetrahydroindenyl groups.

5. The catalyst according to claim 1, wherein in the cyclopentadienyl compound of the formula (I), m is=1, the $C_5R^1{}_{x-m}H_{5-x}$ and $C_5R^1{}_{y-m}H_{5-y}$ groups are selected from the group consisting of tetramethyl-cyclopentadienyl, indenyl, 2-methyl-indenyl, 4,7-dimethyl-indenyl, 2,4,7-trimethyl-indenyl, 4,5,6,7-tetrahydroindenyl, 2-methyl-4,5,6,7-tetrahydroindenyl, 4,7-dimethyl-4,5,6,7-tetrahydroindenyl, 2,4,7-trimethyl-4,5,6,7-tetrahydroindenyl and fluorenyl groups, and $R^2$ is a divalent $(CH_3)_2Si$ or C group.

6. The catalyst according to claim 1, wherein in the cyclopentadienyl compound of the formula (I), the substituents Q are chlorine atoms or methyl groups.

7. The catalyst according to claim 1, wherein the organometallic aluminium compound is a triisoalkyl aluminium.

8. The catalyst according to claim 7, wherein the triisoalkyl aluminium is triisobutyl aluminium.

9. A catalyst for the polymerization of olefins comprising the product obtained by contacting the following components:

(A) a cyclopentadienyl compound of the formula (I):

$$(C_5R^1{}_{x-m}H_{5-x})R^2{}_m(C_5R^1{}_{y-m}H_{5-y})_nMQ_{3-n} \qquad (I)$$

wherein M, $C_5R^1{}_{x-m}H_{5-x}$, $C_5R^1{}_{y-m}H_{5-y}$, $R^1$, $R^2$, Q, m, n, x, and y, are as defined in claim 1; and (B) the reaction product between water and an organometallic aluminium compound of the formula (II):

$$AlR^4{}_{3-z}H_Z \qquad (II)$$

wherein $R^4$ and z are as defined in claim 1, at least one of the substituents $R^4$ being different from a straight alkyl group, the molar ratio between the organometallic aluminium compound and water being from 1:1 to 100:1;

with the proviso that at least part of the reaction product is present in a form different from an alumoxane compound of formula (III):

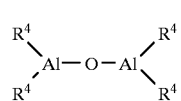

(III)

wherein the substituents $R^4$, same or different from each other, are as defined above.

10. The catalyst of claim 1, wherein x is an integer from m+2 to 5.

* * * * *